Patented Jan. 15, 1952

2,582,795

UNITED STATES PATENT OFFICE 2,582,795

ORGANO-COBALT CHELATES AS ACCELERATORS OF VULCANIZATION

Spencer S. Prentiss and Lawrence R. Sperberg, Bartlesville, Okla., assignors to Phillips Petroleum Company, a corporation of Delaware No Drawing. Application December 27, 1949, Serial No. 135,298

6 Claims. (Cl. 260—41.5)

This invention relates to processing vulcanizable organic plastic substances and the resulting products. In a more specific aspect it relates to accelerating the vulcanization of vulcanizable organic plastic substances, such as natural and/or synthetic rubbers. In still another of its more specific aspects it relates to a class of compounds, namely organo-cobalt chelates, which have been found to be powerful accelerators of vulcanization for vulcanizable organic plastic materials, such as natural and/or synthetic rubbers.

The vulcanization of vulcanizable organic plastic mixes with sulfur or other known vulcanizing agents is a relatively slow and time consuming process unless a curing aid is present which will speed up the vulcanization process. Many vulcanization accelerators are well known in the art, and the vulcanizable plastics compounding industry, particularly the rubber industry, is constantly looking for new, more effective accelerators which will reduce the necessary curing time and thus lower the cost of producing finished articles.

We have now discovered new and extremely powerful vulcanization accelerators, namely, organo-cobalt chelate compounds, which effect a high degree of economy, both by reducing the vulcanization time to a low minimum, and the unusually small quantities required to effect a high rate of cure.

It is an object of this invention to provide a new class of vulcanization accelerators, namely organo-cobalt chelate compounds.

It is another object of this invention to provide new vulcanizable organic plastic mixes and processes for their production.

It is a further object of this invention to provide a new class of accelerators to be used with a vulcanizing agent for accelerating the vulcanization of natural and/or synthetic rubber and mixtures thereof.

Still another object of this invention is to provide very powerful accelerators for the vulcanization of natural and/or synthetic rubber mixes containing cure retarding pigments or for slow curing stocks, such as Butyl rubber stocks.

Other objects and advantages of our invention will become apparent, to one skilled in the art, upon reading this disclosure.

In practicing our invention, we prefer to use a disalicylalethylene-cobalt chelate compound. Typical of the disalicylalethylene-cobalt chelate compounds suitable to use in the practice of our invention are the disalicylalethylenediimine-cobalt compounds. A typical example of these compounds is the following which has the structure,

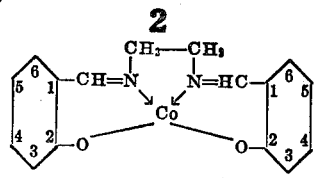

The above compound is commonly known by its proprietary name, "Salcomine." Derivatives of disalicylalethylenediimine-cobalt having substituents in the 3 and/or 5 positions of the nuclei are also suitable. Such substituents can include: hydroxy, alkoxy, alkyl, nitro, halogen and combinations of these groups; and when a plurality of substituents are present they may be like or unlike. For instance, examples of these substituents are 3-fluoro-disalicylalethylenediimine-cobalt, 3-ethoxy-disalicylalethylenediimine-cobalt, and 3-methoxy-disalicylalethylenediimine-cobalt.

The vulcanization accelerators used in the practice of our invention are especially effective where slow curing mixes are to be vulcanized. Examples of such slow curing stocks are natural and/or synthetic rubbers compounded with pigments other than carbon black, such as finely divided silica, clays, and the like. These stocks are slow curing because of these cure retarding pigments which they contain. Another example of a slow curing compound is a Butyl rubber stock. Butyl rubber compounds are relatively slow curing even when compounded with carbon black or other relatively non-cure-retarding pigments because of the relatively few double bonds contained in the molecule of this elastomer.

The use of the organo-cobalt chelate compounds of our invention to accelerate the vulcanization of mixes containing slow curing pigments constitutes a distinct advance in the art, making wider commercial utilization of cure retarding pigments economically feasible. Heretofore, vulcanization accelerators for such stocks have been either ineffective or too expensive. Consequently, their industrial development has been extremely limited, although such pigments have been commercially available for a number of years. Acceleration of these cure inhibiting stocks with organo-cobalt chelate compounds not only provides vulcanizates of improved physical properties, particularly in ageing characteristics as shown by stress-strain properties, but also effects a high degree of economy, both from their low cost of production, and by reducing the curing time using the unusually small quantities required for optimum effect. The same economies are obtained when curing butyl rubber stocks by use of our new accelerators.

In the practice of our invention, we prefer to employ from 0.03 to 3 parts by weight, usually from 0.1 to 1.8 parts by weight, of the organo-cobalt chelate compound per 100 parts by weight of vulcanizable organic plastic, such as natural and/or synthetic rubber. When curing normal curing natural and/or synthetic rubber stocks containing carbon black as pigment, we usually prefer to employ 0.1 to 1.5 parts by weight per 100 parts by weight of rubber, while 0.5 to 1.8 parts by weight per 100 parts by weight of rubber are usually preferred when curing stocks containing vulcanization retarding pigments, such as finely divided silica, clays, etc., or butyl rubber stocks. The organo-cobalt chelate compound may be the sole organic vulcanization accelerator present, or it may be employed in conjunction with other accelerators to obtain specific desired effects.

In its broadest aspect our invention applies to accelerating the vulcanization of vulcanizable organic plastic substances containing unsaturated carbon to carbon bonds. Our invention applies to the vulcanization of natural rubber or to the rubber-like polymers produced by the polymerization of conjugated diolefins, such as butadiene, isoprene, pentadienes, etc., or the copolymerization of such diolefins with a compound containing the group $CH_2=C<$, such as styrene, acrylonitrile, etc., and which is copolymerizable therewith. Our invention is very valuable and the rate of cure is greatly accelerated when it is applied to accelerating vulcanization of butyl rubber stocks which are produced by copolymerizing a major quantity of one or more monoolefins, such as isobutylene, with a minor quantity of a conjugated diolefin, such as those mentioned hereinbefore. Our invention applied to reclaimed natural or synthetic rubbers and to various mixtures of natural, synthetic, reclaimed natural and reclaimed synthetic rubber.

Vulcanizable organic plastic compositions usually contain fillers; modifiers; softeners, tackifiers and plasticizing substances; vulcanizing agents; and accelerators of vulcanization. The exact composition of the vulcanizable organic plastic composition depends upon the use to which the vulcanizable composition is to be put. The organo-cobalt chelates can be used as the accelerator in all of the commonly used compounding recipes.

Carbon black is added to many vulcanizable organic plastic mixes during compounding as a filler. There are many types of carbon blacks used today in compounding, among which are: recently developed high pH furnace carbon blacks having a pH of from 8.0 to 10.5, usually 8.6 to 10.1, such as high abrasion furnace carbon blacks (HAF blacks) and high modulus furnace carbon blacks (HMF blacks); reinforcing furnace blacks (RF blacks) and very fine furnace blacks (VFF blacks); easy, medium, or hard processing channel blacks; lamp blacks; fine and medium thermal carbon blacks; acetylene carbon blacks; semi-reinforcing furnace carbon blacks; conductive furnace and conductive channel carbon blacks; and high elongation furnace carbon blacks. Other pigments, such as ferric oxide, magnesium carbonate, titanium dioxide, zinc oxide, hydrated alumina, kieselguhr, slate dust, zinc peroxide, zinc chloride, lead peroxide, lead oxide, chlorinated paraffins, glue, barytes, fossil flour, lithopone, various clays, finely divided silica, whiting, etc., can be added as fillers or to modify the properties of the vulcanizable composition or vulcanized composition, such properties as the rate of cure, resistance to scorching during processing, activation of acceleration, etc. The powerful organo-cobalt chelate accelerators of our invention are very valuable to speed up vulcanization of rubber mixes containing vulcanization retarding fillers or pigments, such as finely divided silica, various clays, slate dust, and the like.

It is usually desirable or necessary to add softeners, tackifiers and plasticizing substances during the compounding of the vulcanizable organic plastics. There are many such substances, among which are vegetable oils, such as palm oil, rape oil, olive oil, linseed oil, castor bean oil, soya bean oil, tung oil; bitumens including so-called mineral rubbers, which comprise natural products, such as gilsonite, rafaelite, and also high-boiling petroleum residues, asphalts, etc.; pine tar; paraffin wax; mineral oils; fatty acids, such as oleic acid, stearic acid, palmitic acid, lauric acid, etc.; ceresin; naphthalenes; rosin; wool grease; carnauba wax; the many organic chemical compounds, such as glycerol, glyceryl monostearate, glyceryl mono-oleate, glyceryl monoricinoleate, trioctyl phosphate, triglycol dioctoate, ethylene glycol monostearate and the monooleate, phenol-formaldehyde thermosetting resins, poly-alpha-methyl styrene, and other polyers of styrene and substituted styrene, dioctyl phthalate, dioctyl sebacate, polybutenes, zinc resinate, coumarone resins, dihydroabietic acid, etc. Most of these compounds aid tackiness as well as soften or plasticize the vulcanizable organic plastics. Also, some of them exhibit modifying characteristics.

Vulcanizing agents are added to vulcanize the organic plastics during the vulcanization step of processing. There are a wide variety of vulcanizing agents, such as: sulfur, including powdered sulfur, or in one or more other forms, and mixtures thereof; so-called plastic sulfurs; sulfur-containing compounds, such as sulfur chloride, hydrogen sulfide, sulfur thiocyanate, tetra-alkylthiuram disulfides, etc.; selenium; tellurium; benzoyl peroxide; trinitrobenzene; dinitrobenzene; nitrobenzene; quinones; certain inorganic oxidizing agents; diazoaminobenzene and its derivatives; other nitrogen-containing compounds, etc.

Accelerators of vulcanization are added to accelerate vulcanization during the vulcanization step of processing. The organo-cobalt chelate accelerators of our invention can be used to accelerate the vulcanization of vulcanizable organic plastic mixes wherein it is desired to accelerate vulcanization. The organo-cobalt chelates are easily added during the compounding steps of processing. We prefer to add them in powdered form during the mixing step of processing so as to give wide dispersion throughout the mix. For example, they can be added on a mill, Banbury mixer or other mixing device. If desired, they can be added along with other ingredients, such as a softener, etc. There are many other known accelerators of vulcanization, such as: thioureas; thiophenols; mercaptans; dithiocarbamates; xanthates; trithiocarbamates; dithio acids, mercaptothiazoles; mercaptobenzothiazoles; thiuram sulfides; etc., and various mixtures thereof. Some widely used and particularly good accelerators are, for instance, mercaptobenzothiazole, benzothiazyl disulfide, diphenylguanidine, zinc salt of mercaptobenzothiazole, zinc benzothiazyl sulfide, tetramethylthiuram and tetraethylthiuram monosulfide, tetramethylthiuram and tetraethylthiuram disulfide, N-cyclohexyl-2-benzothiazole sulfenamide, aldehyde-ammonias, triphenylguanidine, zinc dibutyl and zinc dimethyl dithiocarbamate, many others, and mixtures thereof. The organo-cobalt chelate accelerators of our invention can be used as the sole accelerator or they can be used in conjunction with the above-mentioned accelerators to give the desired rate of cure. The organo-cobalt chelates of our invention are a new class of accelerators which exhibit very powerful acceleration powers.

In most cases it is the usual practice to add age resistors or antioxidants to vulcanizable organic plastic mixes during the mixing step of processing in order to slow down or prevent the deterioration of the vulcanized product. Antioxidants or age resisters have the property of maintaining tensile strength, resistance to abrasion, elasticity, preventing flex cracking, etc. One or more antioxidants are usually employed, such as phenyl-beta-naphthylamine, p-aminophenol, hydroquinone, p-hydroxydiphenyl, diphenylamine, 2,4-n-toluylene diamine, p-ditolylamine, o-ditolylamine, beta-naphthyl-nitrosoamine, N,N'-diphenyl diamino ethane, phenyl-alpha-naphthylamine, p,p'-diamino-diphenylmethane, etc.

The vulcanizable organic plastic compositions of the process of our invention, resulting from admixing the various ingredients with the organo-cobalt chelate compounds of our invention by the methods known in the prior art, are vulcanized in the usual manner after they are molded or shaped into the desired shape by the numerous shaping operations of the prior art, such as calendering, casting from solution, continuous or discontinuous extrusion, molding in open or closed molds, etc., and they can be used for the many purposes for which other similar compositions are used. For example, they can be used for tire tubes, tire treads, tire casings, shoe soles and heels, raincoats, table covers, hose for the transmission of fluids, belts, balloon coverings, printer's rolls, printer's blankets, engraving plates, aprons, gloves, masks, tanks, battery cases, friction tape mats, wire insulation, etc. Fabrics can be coated or impregnated by calendering or impregnation with a suitable emulsion.

The following are set forth as examples of our invention. It is to be understood that the quantities, materials, etc., set forth in the following examples, are not to unduly limit the scope of our invention.

Example I

Synthetic rubber prepared by copolymerizing butadiene and styrene (GR–S) was compounded in accordance with the following recipes. The figures represent parts by weight.

| Batch No. | A | B | C | D |
|---|---|---|---|---|
| GR-S | 100 | 100 | 100 | 100 |
| Finely divided silica | 65 | 65 | 65 | 65 |
| Asphalt softener | 6 | 6 | 6 | 6 |
| Zinc oxide | 3 | 3 | 3 | 3 |
| Sulfur | 2 | 2 | 2 | 2 |
| "Salcomine" | 0.5 | 1 | 0.5 | |
| N-Cyclohexyl-2-benzothiazole sulfenamide | | | 0.8 | 3 |
| Diphenyl guanidine | | | | 0.5 |

The mixes were milled and cured for varying lengths of time at 307° F. The batch containing no "Salcomine" was included for comparative purposes.

The relaxed compression set data, tabulated below, show the relatively fast rate of cure obtained when using small amounts of "Salcomine" as a vulcanization accelerator, either alone or with small amounts of conventional accelerators. Compression set is a measure of the state of cure; the lower the figure, the more advanced is the cure.

RELAXED COMPRESSION SET DATA

[35% Deflection for 2 Hrs./212° F. Plus 1 Hr. Relaxation/212° F. Per Cent Compression Set.]

| Batch No. | Minutes Cure at 307° F. | | |
|---|---|---|---|
| | 20 | 30 | 45 |
| A | 44.7 | 32.3 | 27.8 |
| B | 29.1 | 17.4 | 15.6 |
| C | 47.7 | 36.1 | 17.8 |
| D | 42.6 | 27.7 | 23.6 |

Stress-strain properties, aged and unaged, measured at 80° F. for the cured rubber stocks are shown in the accompanying table. The aged samples were heated at 212° F. for 24 hours. The stocks containing "Salcomine" show particularly good ageing characteristics, the tensile at break having increased materially after ageing these stocks.

EXAMPLE I

*Stress-strain properties at 80° F.*

| Batch No. | PHR-N-Cyclohexyl-2-Benzothiazole Sulfenamide | PHR Diphenyl Guanidine | PHR Salcomine | PHR Sulfur | Minutes Cure at 307° F. | P. s. i. at— | | | | | | | | Per Cent Elongation | |
|---|---|---|---|---|---|---|---|---|---|---|---|---|---|---|---|
| | | | | | | 100% | | 200% | | 300% | | Break | | | |
| | | | | | | Original | Aged | Original | Aged | Original | Aged | Original | Aged | Original | Aged |
| A | | | 0.5 | 2.0 | 10 | 180 | 290 | 290 | 590 | 800 | | 800 | 650 | 300 | 220 |
| | | | | | 20 | 270 | 460 | 580 | 1,100 | 900 | | 940 | 1,400 | 310 | 250 |
| | | | | | 30 | 280 | 380 | 570 | 960 | | 1,540 | 810 | 1,540 | 280 | 300 |
| | | | | | 45 | 330 | 530 | 690 | 1,270 | 1,170 | 1,810 | 1,400 | 1,810 | 360 | 300 |
| | | | | | 75 | 410 | 540 | 1,010 | 1,400 | 1,630 | | 1,830 | 1,970 | 340 | 290 |
| B | | | 1.0 | 2.0 | 10 | 280 | | 530 | | | | 630 | | 250 | |
| | | | | | 20 | | | | | | | | | | |
| | | | | | 30 | 370 | | 840 | | 1,240 | | 1,570 | | 390 | |
| | | | | | 45 | 450 | | 1,020 | | | | 1,410 | | 280 | |
| | | | | | 75 | 460 | | 1,150 | | 1,750 | | 1,750 | | 300 | |
| C | 0.8 | | 0.5 | 2.0 | 10 | 190 | 240 | | 550 | | | 230 | 610 | 155 | 220 |
| | | | | | 20 | 240 | 410 | 530 | 1,020 | 820 | | 820 | 1,520 | 300 | 280 |
| | | | | | 30 | 290 | 4?0 | 570 | 1,060 | 810 | 1,630 | 810 | 1,690 | 300 | 310 |
| | | | | | 45 | 350 | 570 | 790 | 1,330 | 1,320 | | 1,730 | 1,680 | 380 | 260 |
| | | | | | 75 | 420 | 630 | 1,020 | 1,560 | 1,720 | | 1,760 | 1,870 | 310 | 250 |
| D | 3.0 | 0.5 | | 2.0 | 10 | 160 | 420 | 300 | 1,090 | 500 | | 750 | 1,790 | 300 | 290 |
| | | | | | 20 | 560 | 960 | 1,350 | | 2,270 | | 2,550 | 2,170 | 340 | 190 |
| | | | | | 30 | 320 | 590 | 920 | 1,620 | 1,750 | | 2,300 | 2,200 | 345 | 250 |
| | | | | | 45 | 430 | 610 | 1,130 | 1,670 | 2,040 | | 2,720 | 1,920 | 370 | 230 |
| | | | | | 75 | 600 | 960 | 1,500 | 2,190 | | | 2,480 | 2,410 | 295 | 220 |

EXAMPLE II

Another slow curing rubber mix butyl rubber (GR-I), prepared by polymerizing isobutylene with a small portion of isoprene at sub-freezing temperatures in the presence of a metal halide catalyst, compounded with channel carbon black was tested using "Salcomine" with or without other organic accelerators. The compound not containing "Salcomine" is for comparative purposes. The recipes are given below:

|  | 1 | 2 | 3 | 4 | 5 |
|---|---|---|---|---|---|
| GR-I | 100 | 100 | 100 | 100 | 100 |
| Wyex [1] | 40 | 40 | 40 | 40 | 40 |
| Zinc Oxide | 5 | 5 | 5 | 5 | 5 |
| Stearic Acid | 2 | 2 | 2 | 2 | 2 |
| Salcomine | 0.5 | 1.0 | 0.5 | 1.0 | |
| Tuads [2] | | | | | 1.0 |
| Captax [3] | | | 0.5 | 0.5 | 0.5 |
| Sulfur | 1.5 | 1.5 | 1.5 | 1.5 | 1.5 |

[1] Channel Black.
[2] Tetramethylthiuram disulfide.
[3] Mercaptobenzothiazole.

Stress-strain properties and compression set data for the five stocks are as follows:

Stress-strain properties at 80° F.

| No. | PHR Tuads | PHR Captax | PHR Salcomine | Minutes cure at 320° F. | P. s. i. at— 100% | 200% | 300% | 400% | 500% | Break | Per cent Elongation |
|---|---|---|---|---|---|---|---|---|---|---|---|
| 1 | | | 0.5 | 5 | | | | | 80 | 1,180 | 1,100 |
| | | | | 8 | | | 50 | 100 | 190 | 1,560 | 965 |
| | | | | 12 | | | 70 | 130 | 340 | 2,150 | 970 |
| | | | | 25 | | | 150 | 340 | 640 | 2,620 | 850 |
| 2 | | | 1.0 | 5 | | | | | | 1,460 | 1,090 |
| | | | | 8 | | | | 40 | 170 | 1,730 | 925 |
| | | | | 12 | | | | 140 | 310 | 1,940 | 840 |
| | | | | 25 | | | 140 | 330 | 610 | 3,160 | 850 |
| 3 | | 0.5 | 0.5 | 5 | | | | | | 980 | 1,275 |
| | | | | 8 | | | | 130 | 230 | 2,080 | 1,020 |
| | | | | 12 | | | | 190 | 230 | 2,540 | 1,000 |
| | | | | 25 | | | 180 | 350 | 610 | 2,640 | 820 |
| 4 | | 0.5 | 1.0 | 5 | | | | | | 1,590 | 1,180 |
| | | | | 8 | | | | | | 1,720 | 960 |
| | | | | 12 | | | | 120 | 270 | 2,420 | 925 |
| | | | | 25 | | | 120 | 190 | 620 | 2,730 | 855 |
| 5 | 1.0 | 0.5 | | 5 | | | | | 90 | 1,770 | 1,005 |
| | | | | 8 | | | | 210 | 380 | 2,450 | 900 |
| | | | | 12 | | | 190 | 340 | 390 | 2,370 | 800 |
| | | | | 25 | | | 290 | 540 | 800 | 2,620 | 770 |

OVEN AGED 24 HRS./212° F.

| 1 | | | 0.5 | 5 | | | | 100 | 230 | 1,560 | 1,000 |
|---|---|---|---|---|---|---|---|---|---|---|---|
| | | | | 8 | | | 70 | 160 | 380 | 1,870 | 960 |
| | | | | 12 | | | 160 | 280 | 540 | 2,370 | 960 |
| | | | | 25 | | | 90 | 210 | 410 | 680 | 1,990 | 780 |
| 2 | | | 1.0 | 5 | | | | | 70 | 1,870 | 1,035 |
| | | | | 8 | | | 40 | 140 | 390 | 2,260 | 930 |
| | | | | 12 | | | | 220 | 510 | 2,410 | 530 |
| | | | | 25 | | | 80 | 210 | 480 | 840 | 2,440 | 750 |
| 3 | | 0.5 | 0.5 | 5 | | | | | | 1,050 | 1,150 |
| | | | | 8 | | | | | 80 | 1,880 | 1,045 |
| | | | | 12 | | | | | 240 | 1,820 | 880 |
| | | | | 25 | | | 80 | 320 | 580 | 2,520 | 820 |
| 4 | | 0.5 | 1.0 | 5 | | | | | | 900 | 1,000 |
| | | | | 8 | | | | | 80 | 1,970 | 995 |
| | | | | 12 | | | | 90 | 280 | 2,200 | 920 |
| | | | | 25 | | | 90 | 320 | 620 | 2,460 | 800 |
| 5 | 1.0 | 0.5 | | 5 | | | | 120 | 420 | 2,540 | 895 |
| | | | | 8 | | | 220 | 440 | 710 | 2,830 | 810 |
| | | | | 12 | | | 90 | 280 | 530 | 900 | 1,600 | 655 |
| | | | | 25 | | | 80 | 340 | 610 | 960 | 2,350 | 705 |

RELAXED COMPRESSION SET DATA

[35% Deflection for 2 Hrs./212° F. Plus 1 Hr. Relaxation/212° F. Per Cent Compression Set.]

| No. | PHR Tuads | PHR Captax | PHR Salcomine | Minutes Cure at 320° F. | | | |
|---|---|---|---|---|---|---|---|
| | | | | 5 | 8 | 12 | 25 |
| 1 | | | 0.5 | 77.1 | 48.3 | 39.6 | 23.0 |
| 2 | | | 1.0 | 76.4 | 52.1 | 41.4 | 25.5 |
| 3 | | 0.5 | 0.5 | 93.2 | 55.9 | 40.5 | 20.0 |
| 4 | | 0.5 | 1.0 | 86.0 | 58.2 | 42.7 | 23.0 |
| 5 | 1.0 | 0.5 | | 80.8 | 47.1 | 42.7 | 22.4 |

In examples, PHR means parts per hundred by weight per 100 parts by weight of GR-S or GR-I.

As will be evident to those skilled in the art, various modifications of this invention can be made, or followed, in the light of this disclosure and discussion, without departing from the spirit or scope of this disclosure or from the scope of the claims.

We claim:

1. A vulcanizable composition comprising, a sulfur vulcanizable organic polymeric substance selected from the group consisting of natural rubber, diolefin polymers and copolymers of diolefins and comonomers containing the terminal group $CH_2=C<$, a vulcanization retarding pigment, a vulcanizing agent and from 0.5 to 1.8 parts by weight of a disalicylalethylenediimine-cobalt per 100 parts by weight of said sulfur vulcanizable organic plastic substance.

2. The sulfur vulcanizable composition of claim 1 wherein said vulcanization retarding pigment is finely divided silica, said vulcanizing agent is sulfur and said disalicylalethylenediimine-cobalt is disalicylalethylenediimine-cobalt.

3. A vulcanizable composition comprising, natural rubber, a vulcanization retarding pigment, a vulcanizing agent and from 0.5 to 1.8 parts by weight of a disalicylalethylenediimine-cobalt.

4. The vulcanizable composition of claim 3 wherein the vulcanization retarding pigment is finely divided silica, and said vulcanizing agent is sulfur.

5. In the process of making a product from a mixture of a sulfur vulcanizable organic polymeric material selected from the group consisting of natural rubber, diolefin polymers and copolymers of diolefins and comonomers containing the terminal group $CH_2=C<$; and a vulcanization retarding pigment, wherein during processing, a mixture is made containing same in admixture with a vulcanizing agent, that improvement which comprises adding to said mixture a disalicylalethylene-cobalt compound.

6. The process of claim 5 where the vulcanization retarding pigment is finely divided silica.

SPENCER S. PRENTISS.
LAWRENCE R. SPERBERG.

REFERENCES CITED

The following references are of record in the file of this patent:

UNITED STATES PATENTS

| Number | Name | Date |
|---|---|---|
| 2,129,615 | Calvert | Sept. 6, 1938 |
| 2,155,590 | Garvey | Apr. 25, 1939 |
| 2,181,122 | Downing et al. | Nov. 28, 1939 |
| 2,352,462 | Weiss | June 27, 1944 |